United States Patent [19]

Vieira et al.

[11] 3,977,076
[45] Aug. 31, 1976

[54] INTERNAL PIPE CUTTING TOOL

[75] Inventors: Manuel Vieira; Michael M. Vieira; Manuel Vieira, Jr.; Robert M. Vieira, all of Union, N.J.

[73] Assignee: One Michigan Avenue Corporation, Union, N.J.

[22] Filed: Oct. 23, 1975

[21] Appl. No.: 625,021

[52] U.S. Cl. ................................................. 30/103
[51] Int. Cl.² ...................... B23D 21/14; B26D 3/16
[58] Field of Search ............. 30/103, 104, 105, 106, 30/107; 81/72

[56] References Cited
UNITED STATES PATENTS

| 482,496 | 9/1892 | Coppage | 30/103 |
|---|---|---|---|
| 828,120 | 8/1906 | Jones | 30/103 |
| 2,125,864 | 8/1938 | Auckland | 30/103 |
| 2,695,449 | 11/1954 | Chauvin | 30/107 |

Primary Examiner—Al Lawrence Smith
Assistant Examiner—James G. Smith
Attorney, Agent, or Firm—Daniel H. Bobis

[57] ABSTRACT

An internal pipe cutting tool to be inserted in an end opening of a pipe to be cut from the inside out has an outer elongated hollow support member with an adjustable support collar at one end to adjust the length of the pipe to be cut by the pipe cutting tool, and a cam member at the opposite end having a cam face of predetermined shape. An inner drive member lies in the longitudinal center line of the outer support member and projects at one end to the exterior thereof for receiving a driving tool on said exterior end and at the opposite end is threadably connected through the cam member so that a support and guide member outboard thereof will provide means for pivotally connecting the cutting jaws of a cutting jaw assembly disposed in assembled position to coact with the cam surface of said cam member. When the outer support member is turned clockwise the cam member is caused to expand the cutting jaws of the cutting jaw assembly into cutting position with the inner wall of the pipe to be cut and the inner drive member drives the expanded cutting jaws of the cutting jaw assembly, so that as the cutting jaw assembly is progressively expanded by clockwise movement of the outer support member the cutting jaws will progressively cut through the pipe to be cut from the inside wall out.

10 Claims, 16 Drawing Figures

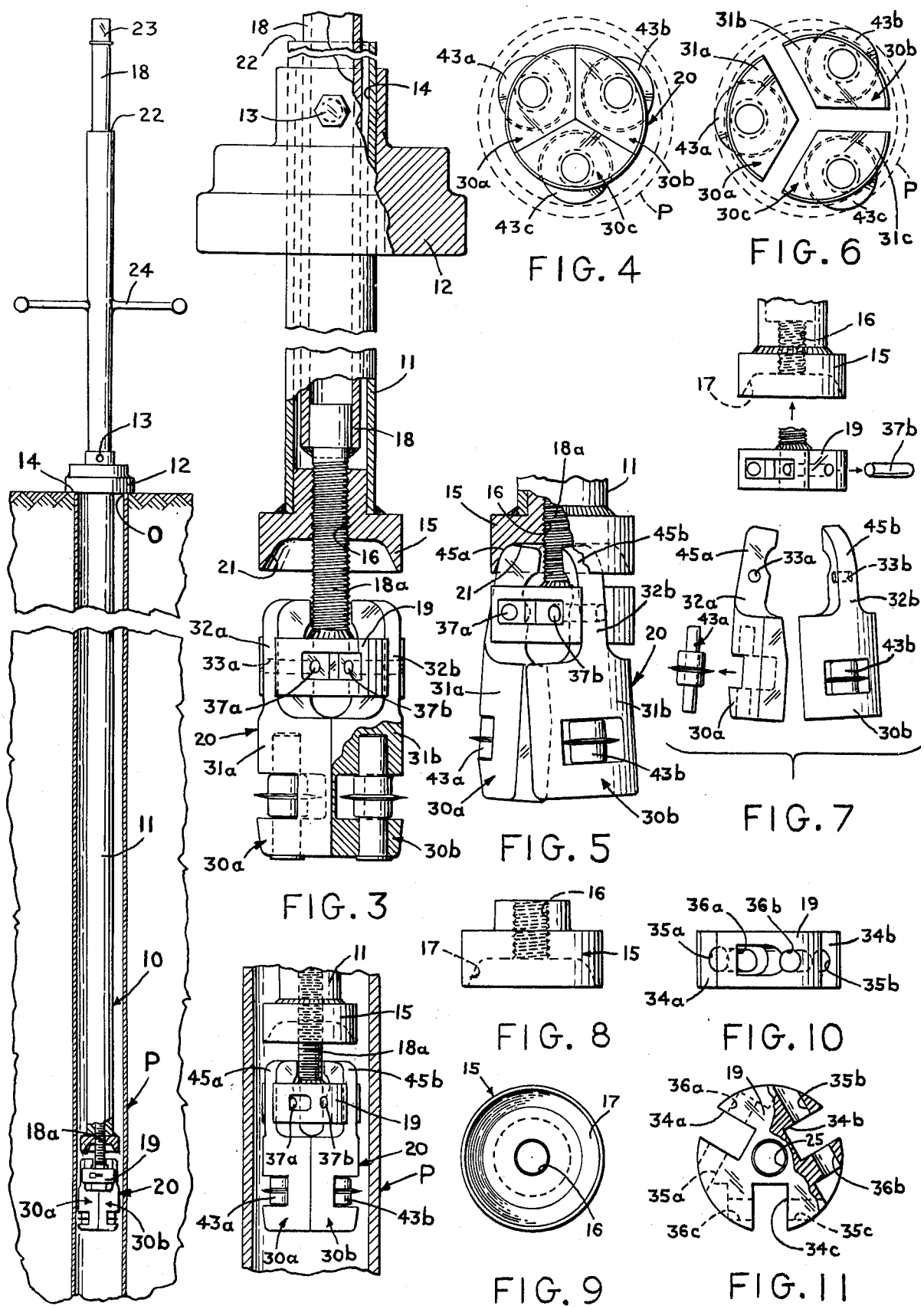

INTERNAL PIPE CUTTING TOOL

BACKGROUND OF THE INVENTION

This invention relates generally to devices for cutting pipes and more particularly to a tool designed for cutting the pipe by engagement with the inside wall thereof.

It is often difficult to cut a pipe by the conventional transverse cutting through the outer wall thereof by reason of the location, such as a pipe buried in the ground or extended through a structure which cannot be removed.

Further in the case of certain systems which are buried underground such as fuel or gas tanks, municipal ordinances require that when such systems are rendered inoperable or unuseable that the filling pipes for such systems must be removed.

One method of removing such pipes is to pass a suitable cutting tool through an available opening for such pipe so that the pipe can be cut by engagement with the inner wall thereof.

For this purpose various types of internal pipe cutting tools have been developed in the art as is shown in U.S. Pat. Nos. 514,985; 295,307; and 2,728,138. These tools generally are insertable through an opening of the pipe for a length within the limits of the particular tool and have cutting jaws which can be progressively expanded as the tool is rotated so that cutting heads on the cutting jaws will progressively cut through the wall of the pipe from the inside thereof.

The present invention provides an improved internal type cutting tool in that the manner in which the tool is supported and the construction of the means for actuating the cutting jaws relies on cam action to pivot the jaws so as to bring the cutting heads into cutting engagement with the inner wall of the pipe to be cut.

SUMMARY OF THE INVENTION

Thus the present invention covers an improved internal pipe cutting tool consisting of an outer elongated hollow support member having an adjustable support collar to adjust the cutting length of said internal pipe cutting tool, cam means connected to the end of the support member remote from the adjustable support collar, a drive member lieing and extending in the longitudinal line of the outer support member and having a length so that in assembled position one end extends beyond the support member to a point exterior of the pipe being cut and the other end is threadably connected to extend through said cam means, a support and guide member on the end of said drive member outboard of said cam means, a cutting jaw assembly with cutting jaws pivotally connected on said support and guide member, said cam means operatively associated with the cutting jaws of the cutting jaw assembly to open the same when said outer support member is rotated in one direction and to close the same when the outer support member is rotated in the opposite direction, and said drive member rotatable to drive the cutting jaws so that the pipe will be cut by the progressive engagement of the cutting jaws as they are expanded by rotation of the outer support member.

With the above and other objects and advantageous features in view, the invention consists of a novel arrangement of parts more fully disclosed in the detailed description following in conjunction with the accompanying drawings in which:

FIG. 1 is a vertical section through a fill pipe showing an internal pipe cutting tool in accordance with the present invention therein inside elevation with the cutting jaws shown in the closed or unexpanded position, FIG. 2 is an enlarged view of a fragment of the fill pipe and of the internal pipe cutting tool at the cutting jaw assembly level thereof.

FIG. 3 is an enlarged side elevation of the internal pipe cutting tool shown in FIG. 1 with portions thereof in vertical section.

FIG. 4 is an end view of the cutting jaw section of the internal pipe cutting tool shown in FIG. 1 with the fill pipe shown in dotted lines.

FIG. 5 is an enlarged side elevation of the cutting jaw section of the internal pipe cutting tool shown in FIG. 1 with the cutting jaws partly expanded or open.

FIG. 6 is an end view of the cutting jaw section of the internal pipe cutting tool as shown in FIG. 5 with the cutting heads expanded into the wall of the fill pipe shown in dotted lines.

FIG. 7 is an exploded view of the cutting jaw end of the internal pipe cutting tool shown in FIG. 1.

FIG. 8 is a side view of the cam member associated with the cutting jaws shown in FIGS. 2 to 7 of the drawings.

FIG. 9 is a front view of the cam member shown in FIG. 8 showing the cam surface thereon.

FIG. 10 is a side view of the support and guide means for the cutting jaws of the internal pipe cutting tool shown in FIG. 1.

FIG. 11 is a front view of the support and guide means shown in FIG. 10 partly in cross section.

Figure 12:
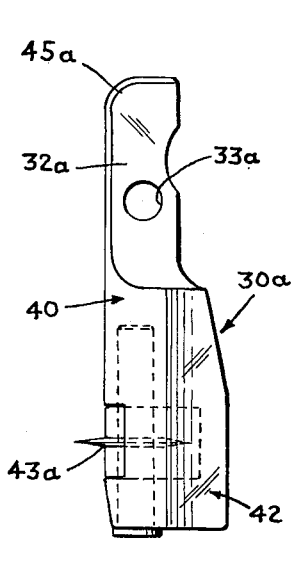
FIG. 12 is a side view of one of the cutting jaws for the internal pipe cutting tool shown in FIG. 1.

Referring to the drawings FIG. 1 shows generally an underground or concealed pipe P which can be a fill pipe for a tank, not shown, or any type of concealed system, such pipe P being illustrative of a pipe which it is desirable to cut and remove.

Such pipes generally have an opening O which will permit the insertion into the bore thereof of an internal pipe cutting tool and one such internal pipe cutting tool generally designated 10 in accordance with the present invention is shown mounted in the said pipe P for cutting the pipe from the interior wall to the exterior wall thereof.

This is of course a preferred way for cutting and removing a concealed pipe because of the obvious difficulties which would attach if it were necessary to cut such concealed pipe from the external wall inwardly a matter which will be clearly understood by those skilled in the art.

The internal pipe cutting tool 10 includes an outer support member 11 which is a generally elongated hollow cylindrical pipe member. Support member 11 has an adjustable support collar 12 which will be connected to the support member as by a threaded member 13 or other suitable means so as to permit positioning of the adjustable support collar a predetermined distance from the upper or outer end of the support member 11 depending upon the length of the pipe to be cut and removed.

The adjustable support collar is a flat cylindrical element with a centrally disposed bore so that when the support member 11 is extended through the bore the support collar will lie transverse to the longitudinal line of the support member. Further the adjustable support collar has a substantially greater diameter than the support member 11 to permit the support collar to engage and abut against the end 14 of the pipe P about the opening O thereof through which the internal pipe cutting tool is inserted or on the surfaces adjacent to the point where the opening of the pipe to be cut is located all of which is shown in FIG. 1 of the drawing.

At the end of the support member 11 remote from the support collar 12, a cam member 15 is fixedly connected as by welding or any other suitable means so that a threaded bore 16 therethrough lies in the longitudinal line of the support member 11. On the outer face or outboard side the cam member 15 is provided with a cam surface 17 which is cut to a predetermined curvature for actuating a cutting jaw assembly generally designated 20 more fully described hereinafter.

Lieing and extending substantially in the longitudinal center line of the outer support member 11 is an inner driving shaft or member 18 which will of course have a lesser diameter than the inner diameter of the support member in order to be mounted in this assembled position.

FIGS. 1 and 2 show that the driving member 18 has a length and is sized to extend beyond either end of the support member 11. Thus at one end it is provided with a threaded section 18a for threadibly mounting the driving member through the threaded bore 16 of the cam member 15 so as to receive on the outer or outboard side of the cam member 15 a support and guide means 19 for the cutting jaw assembly 20.

At the point where the driving member 18 extends beyond the exterior end 22 of the support member it is specially formed as at 23 to receive a wrench or the like driving tool, not shown, for rotating or driving the cutting jaw assembly 20 as will appear clear from the description of the operation set forth below.

FIG. 1 further shows that a handle member as at 24 is fixedly connected to the support member 11 so that either the entire internal pipe cutting tool can be turned or moved when it is in assembled position or the support member 11 can be rotated relative the inner drive member for purposes that will appear clear in respect of the operation of the cutting jaw assembly from either open to close position or close to open position as cutting requirements of the internal pipe cutting tool 10 may require.

The support and guide member 19 for the cutting jaw assembly 20 is a cylindrical member having a bore 25 therethrough. As is shown in FIGS. 2, 3 and 5 the end of the threaded section 18a of the driving member 18 which extends beyond the cam surface 17 of the cam member 15 is fitted into said bore and is fixedly connected thereto by any suitable means such as welding.

When the outer support member 11 is rotated it moves by reason of the threaded connection with the drive member towards and away from the support and guide member 19 connected thereto and the associated elements of the cutting jaw assembly 20 mounted thereon now to be more fully described.

CUTTING JAW ASSEMBLY

In the form of cutting jaw assembly illustrated the support and guide member 19a is designed to carry three cutting jaws 30a, 30b and 30c each identical in construction so they fit in abutting relationship with each other. The cutting jaws 30a, 30b and 30c are disposed on 120° radial centers and so fit and abut each other that the cutting jaw assembly 20 has a cylindrical outer periphery with a diameter only slightly larger than that of the support member 11 as is clearly shown in FIGS. 1, 2 and 3 of the drawings.

It will be understood that other circumferential spacing of the cutting jaws could be utilized without departing from the scope of the present invention. For example there could be two jaws spaced on 180° radial centers or four jaws on 90° centers.

The cutting jaws 30a, 30b and 30c are elongated members each having a relatively wide cutting head support section as at 31a, 31b and 31c and a relatively narrow connecting section as at 32a, 32b and 32c and in each connecting section a bore as at 33a, 33b and 33c normal to the longitudinal line of the connecting section will be formed to receive a pivot shaft therethrough about which the cutting jaws will pivot when the cutting jaws are disposed in assembled position on the support and guide member 19.

By reference to FIGS. 10 and 11 the cutting jaw support and guide member is shown to have radially inward extending slots 34a, 34b and 34c which may be formed or cut therein on 120° radial centers. In order to provide means for pivotally connecting the cutting jaws 30a, 30b and 30c in said slots 31a, 31b and 31c spaced aligned bores as at 35a, and 36a, 35b and 36b, and 35c and 36c are formed in the support and guide member 19 normal to the radial line of the slots 34a, 34b and 34c so that when the connecting section of the cutting jaws 30a, 30b and 30c are respectively fitted into the slots 34a, 34b and 34c, the bores 33a, 33b and 33c thereon will be aligned with the spaced aligned bores 35a and 36a, 35b and 36b and 35c and 36c, not shown in the support and guide member so that a pivot shaft as at 37a, 37b and 37c may be extended through these bores and act to pivotally connect the respective cutting jaws 30a, 30b and 30c into assembled position on the support and guide member 19.

FIGS. 2 to 6 of the drawings show that the cutting jaws are shaped to fit in abutting relationship with each other when the cutting jaws are closed or in the unexpanded position as is shown in FIGS. 1, 2, 3 and 4 of the drawings and that they may be pivoted about the pivot shafts 37a, 37b and 37c so that the cutting head support sections when in the open or expanded position will be separated from each other as is shown in FIGS. 5 and 6 of the drawings.

In order to achieve this result the cutting head support sections 31a, 31b and 31c are provided with a special design which establishes the geometric relationship of the elements and the connecting sections are formed to permit operative engagement with the cam surface of the cam member 15 when the cutting jaw assembly 20 is moved so as to bring the end of the connecting sections 32a, 32b and 32c which are disposed adjacent to the cam member in engagement with the cam surface 21 thereof.

Figure 13:
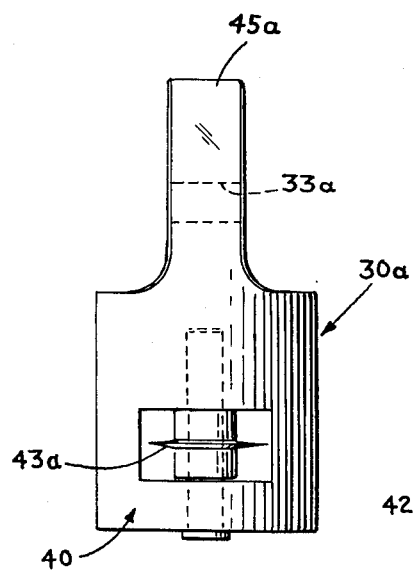
FIG. 13 is a front view of the outer face of one of the cutting jaws for the internal pipe cutting tool shown in FIG. 1.
Figure 14:
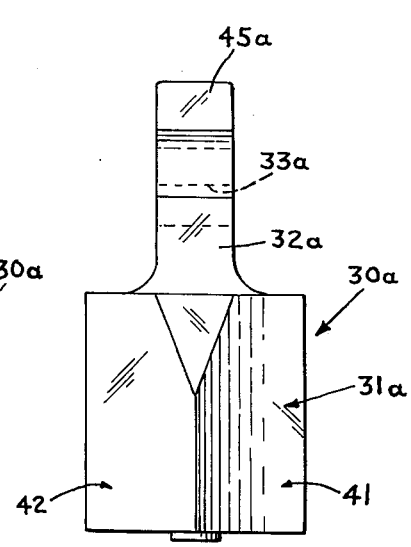
FIG. 14 is a back view of the inner face of one of the cutting jaws for the internal pipe cutting tool shown in FIG. 1.
Figures 15, 16:
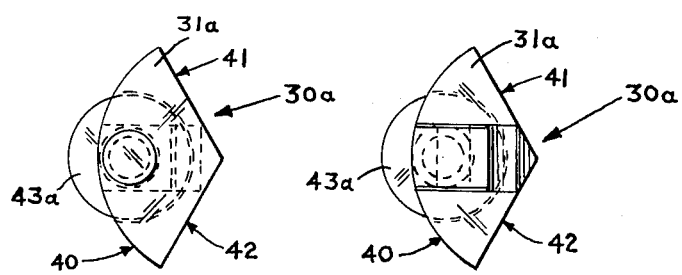
FIG. 15 is an end view of the outboard end of one of the cutting jaws for the internal pipe cutting tool shown in FIG. 1.
FIG. 16 is an end view of the inboard side of one of the cutting jaws for the internal pipe cutting tool shown in FIG. 1.

Thus referring to FIGS. 12 to 16 of the drawings which illustrate only one of the cutting jaw 30a, all of the cutting jaws being identical in construction, the cutting head support sections 31a, 31b and 31c each have an arcuate outer surface 40 which spans 120° of the circumference of a circle and an inner surface formed by two radially extending inner walls 41 and 42 which intersect each other to define at the center of the radius an inscribed angle there between of 120°.

Since the cutting jaws are identical in design the inscribed angle of 120° formed by the inner walls 41 and 42 is the same for each of the cutting jaws and accordingly adjacent walls of adjacent cutting jaws will snugly engage and fit each other as is shown at FIGS. 1, 2, 3 and 4 of the drawings.

Similarly the connecting sections 32a, 32b and 32c of each of the cutting jaws are shown to have a narrow elongated form and extend from the cutting head support section in the longitudinal line of the cutting jaw. The connecting sections are sized to provide a sliding fit with the associated slots or recesses 34a, 34b and 34c and by reference to FIGS. 2, 3 and 7 of the drawings the support and guide member 19 is shown as disposed normal to the longitudinal line for the internal pipe cutting tool so that the slots and recesses will be on radii which also are normal thereto and extend through the center of the longitudinal line. Thus, when pivotally mounted in the slots or recesses 34a, 34b and 34c the cutting jaws will also be on these same radii and therefore the longitudinal line of the cuttings jaws will also be normal to the longitudinal axis of the internal pipe cutting tool and will be disposed in a plane which passes through the center of the longitudinal line.

Further the bores 33a, 33b and 33c through the connecting sections 32a, 32b and 32c will be so spaced that in assembled position on their respective pivot shafts 37a, 37b and 37c a fulcrum is provided approximately one third of the distance from the end of the connecting section which lies adjacent to the cam surface 21 of the cam member 15. It is thought obvious to those skilled in the art that the position of the fulcrum and the degree of movement that can be imparted to the cam follower end of the connecting sections 32a, 32b and 32c by the cam surface 21 will control the degree of expansion or opening action of the cutting jaws 31a, 31b and 31c relative each other and since the cutting heads generally designated 43a, 43b and 43c on the respective cutting jaws 31a, 31b and 31c are connected and supported by the cutting head support sections the degree of movement of such cutting heads will be a function of the degree of expansion that can be imparted to the cutting jaws 31a, 31b and 31c of the cutting jaw assembly 20.

FIGS. 2, 3, 7, 13 and 14 show that the ends of each of the connecting sections 32a, 32b and 32c form a rounded cam follower means as at 45a, 45b and 45c which will follow the cam surface 31 of the cam member 15 when the actuating member 18 is rotated to move the cutting jaw assembly so that the cam follower on the connecting section is brought into engagement therewith.

Thus the pivot shafts 37a, 37b and 37c for each of the cutting jaws 31a, 31b and 31c provides a fulcrum which is disposed between the cutting head support section 31a, 31b and 31c outboard of the respective pivot shafts and the cam follower means 45a, 45b and 45c which is inboard of the respective pivot shafts and this arrangement provides a conventional first class lever and therefore the force exerted on the cam follower means will cause the cutting jaws to pivot about the fulcrum for the respective cutting jaws and the cutting head support section will be caused to pivot outwardly or away from the center of the longitudinal line for the internal pipe cutting tool as is shown in FIGS. 5 and 6 of the drawings.

As in all other first class levers the degree of movement and the force required to move the cutting head assembly will be a function of the ratio of the respective lengths of the arms between; the fulcrum and the point where the force is applied as the one arm at the inboard end of the cutting jaw assembly; and the length between the fulcrum and the cutting head assembly as the other arm.

The force required to pivot the respective cutting jaws can be predetermined so that the position of the fulcrum can be advantageously located for the best ratio to movement available in the confined space in which the cutting jaw assembly must operate in order for the tool to function properly.

As will be understood by those skilled in the art, the size or diameter of the cutting jaw assembly and the range of movement from closed to open position will be predetermined by two factors. First the inner diameter or bore of the pipe and second the thickness of the wall of the pipe to be cut.

For example where the pipe to be cut has an inner diameter of 4 inches and a wall thickness in a range from ¼ to ⅜ inches the closed position of the cutting jaw assembly will be 3 ⅞ inches so the internal pipe cutting tool can easily enter the inside of the 4 inch pipe and the cutting jaw assembly will open to a diameter of more than 5 inches. Thus the expanded position of the cutting jaw assembly will be equal to a total net expansion in diameter of 1 ⅛ inches.

OPERATION AND USE

In the operation and use of the internal pipe cutting tool in accordance with the present invention, the depth or length of the pipe to be cut is predetermined by measuring the required distance. Then the adjustable collar 12 is positioned along the support member 11 for the measured distance to be cut.

The length of the pipe section that can be cut by an internal pipe cutting tool in accordance with the present invention will have a minimum limit of about 6 inches. However, the maximum length of pipe section that can be cut varies as a function of the length of the respective outside and inside members. These members can be purchased in standard stock sizes up to 20 feet in length. If longer lengths are required, additional lengths of the outer support member and inner drive member can be coupled together and will function provided the torque to be applied during the rotation of these members for adjusting the cutting jaw assembly does not exceed the coefficient of elasticity of the materials from which the outer support member and inner drive member are made.

The internal pipe cutting tool is next inserted through the end opening O of the fill pipe P until the adjustable support collar 12 engages the end 14 of the pipe. The handle 24 is then grasped by the operator and the outer support member 11 is rotated clockwise and this will bring the cam surface 21 into tight engagement with the cam follower means 45a, 45b and 45c of the respective cutting jaws 30a, 30b and 30c so that additional rotation will then cause the respective cam follower means to follow the cam surface 21 and thus force the respective connecting section 32a, 32b and 32c on the inboard end of the pivot shaft 37a, 37b and 37c to move inward or towards the center of the longitudinal line of the internal pipe cutting tool. Since the cutting jaws are substantially rigid members this will cause a corresponding outward movement away from the center of the longitudinal line of the internal pipe cutting tool of the cutting head assembly support section of the cutting jaws until the cutting head assemblies 43a, 43b and 43c engage the internal wall of the pipe P to be cut.

After initial engagement of the internal wall of the pipe P is made by the cutting head assemblies 43a, 43b and 43c of the cutting jaw assembly 20 the operator will apply a suitable torque device for manual operation such as a wrench or for mechanical operation such as an electrically driven wrench to the end 23 of the inner drive member 18 and will rotate the cutting jaw assembly 20 several times.

The outside support member is again turned as above described to further expand the cutting jaws of the cutting jaw assembly. This will bring the cutting head assemblies 43a, 43b and 43c into deeper engagement with the inner wall of the pipe P so that on rotation of the inner drive member 18 the internal pipe cutting tool will make a deeper cut than the initial engagement. This progressive incremental expansion of the cutting jaws and cutting head assemblies thereon is repeated and followed by turning of the inner drive member until the cutting head assembly cuts the pipe transversely from the inner wall to the outer wall thereof.

When cutting is completed the direction of rotation of the outer shaft member 11 is reversed by turning the handle 24 counter clockwise. As the cam member 15 is moved along the threaded section 18a by this reversing action the cutting jaws 31a, 31b and 31c will be moved to the closed position and will clear the cutting head assemblies thereon from the inner wall of the pipe P and this action will be continued until the cutting jaw assembly 20 is in the closed position once again. Thereafter the internal pipe cutting tool can be removed from the pipe P and this can be followed by removing the cut portion of the pipe P from its original position in the ground.

Thus there has been described an improved internal pipe cutting tool which will cut pipe from the inside out and is particularly adapted to cut long lengths of submerged or concealed pipes in the ground without excavation, pavement replacement or other expensive procedures for cutting such pipe.

It will be understood that the invention is not to be limited to the specific construction or arrangement of parts shown but that they may be widely modified within the invention defined by the claims.

What is claimed is:

1. An internal pipe cutting tool for cutting pipe from the inner wall out comprising:
   a. an elongated support member having, an adjustable support collar to adjust the cutting length of said internal pipe cutting tool,
   b. cam means connected to the end of the support member remote from the adjustable collar, and a cam surface means formed on the outer face of said cam means,
   c. a drive member rotatably mounted on said support member and rotatable from a point exterior of the support member at one end and having the other end disposed adjacent the cam means,
   d. support and guide means connected to the end of the drive member adjacent the cam means,
   e. a plurality of operatively associated cutting jaws each pivotally connected at a medial point thereon to the support and guide means, cutting means on the outboard end of each said cutting jaws, and said cutting jaws disposed in normally closed position,
   f. said support member rotatable in one direction to bring the cam means into engagement with the cutting jaws for opening the same and in the other direction to permit the cutting jaws to return to their normally closed position whereby the cutting means on the outboard end of the cutting jaws will be brought into and out of cutting engagement with the inner wall of the pipe to be cut, and
   g. said drive member for rotating the cutting jaw assembly as the cutting means thereon is brought into progressive incremental engagement with the inner wall of the pipe for cutting the pipe to the desired length.

2. An internal pipe cutting tool for cutting pipe from the inner wall out comprising:
   a. an elongated support member having an adjustable support collar to adjust the cutting length of said internal pipe cutting tool,
   b. cam means connected to the end of the support member remote from the adjustable collar, and cam surface means formed on the outer face of said cam means,
   c. a drive member disposed along the longitudinal line of said support member and connected for relative movement between said support member and said drive member from a point exterior to the pipe being cut and one end of the drive member being disposed adjacent the cam means,
   d. support and guide means connected to the end of the drive member adjacent the cam means,
   e. a cutting jaw assembly having a plurality of operatively associated cutting jaws each pivotally connected at a medial point thereon to the support and guide means and disposed normally in closed position.
   f. cutting head means on each of said cutting jaws outboard of said pivotal connection on the support and guide means; and cam follower means on each of said cutting jaws formed on the inboard side of said pivotal connection,
   g. said support member rotatable in one direction to bring the cam means into engagement with the cam follower means on said cutting jaws for opening the same and in the other direction to permit the cutting jaws to return to their normally closed position whereby the cutting head means on the outboard end of the cutting jaws will be brought into and out of cutting engagement with the inner wall of the pipe to be cut, and
   h. said drive member for rotating the cutting jaw assembly as the cutting head means thereon is brought into progressive incremental engagement with the inner wall of the pipe for cutting the pipe to the desired length.

3. In an internal pipe cutting tool as claimed in claim 2 wherein:
   a. the cam means has a threaded bore substantially in the longitudinal line of the support member,
   b. said drive member has a threaded section disposed to engage and extend through said threaded bore, c. said drive member having a length greater than the support member and to extend beyond the exterior end of the support member remote from the threaded bore in the cam means, d. and means on the support member for threading said support member to and fro relative to the drive member.

4. In an internal pipe cutting tool as claimed in claim 2 wherein the cutting jaws are shaped to fit into close engagement with each other when the cutting jaw assembly is in normally closed position, and sized to fit into the pipe to be cut.

5. In an internal pipe tool as claimed in claim 2 wherein:

a. said support and guide means has radially inward extending slots spaced on 120° centers, b. each of said cutting jaws having a connecting section, and said connecting section having a width to permit slidable engagement with said slots on the support and guide means, c. means for pivotably connecting the connecting section of each of the cutting jaws in an associated slot on said support and guide means, and d. said cam follower means disposed at the inboard end of each of the connecting sections on the respective cutting jaws.

6. In an internal pipe cutting tool as claimed in claim 1 wherein:

a. said plurality of cutting jaws have a cutting head support section shaped to fit into close engagement with each other when the cutting jaw assembly is in the normally closed position and sized to fit into the pipe to be cut, b. each of said cutting head support sections having at least two radially extending inner surfaces which intersect so that the inscribed angle there between is 120°, and c. the outer face of each of said cutting head support section is formed as a part of a circle over an arc of 120°.

7. In an internal pipe cutting tool as claimed in claim 2 wherein:

a. said support and guide means has radially inward extending slots spaced on 120° centers, b. each of said cutting jaws having a connecting section connected to and continuous with the cutting head support sections, and said connecting section having a width to permit slidable engagement with said slots on the support and guide means, c. means for pivotably connecting the connecting section of each of the cutting jaws in an associated slot on said support and guide means, and d. said cam follower means disposed at the end of each of the connecting sections on the respective cutting jaws, e. said plurality of cutting jaws have a cutting head support section shaped and sized to fit into close engagement with each other when the cutting jaw assembly is in the normally closed position, f. each of said cutting head support sections having at least two radially extending inner surfaces which intersect so that the inscribed angle there between is 120° and, g. the outer face of said cutting head support section is formed as a part of a circle over an arc of 120°.

8. In an internal pipe cutting tool as claimed in claim 2 wherein:

a. the drive member is an elongated element having a length greater than the length of the support member, and having a threaded section thereon, b. said drive member disposed to lie in said support member and to extend beyond the end of the support member, c. said cam member having a threaded bore therethrough, d. the threaded section of said drive member threadably connected to the threaded bore in the cam member, and e. means on the end of the support member for rotating the same to thread the threaded bore of the cam member to and fro relative the threaded section of the drive member.

9. In an internal pipe cutting tool as claimed in claim 8, wherein:

a. said support and guide means has radially inward extending slots spaced on 120° centers, b. each of said cutting jaws having a connecting section connected to and continuous with the cutting head support sections, and said connecting section having a width to permit slidable engagement with said slots on the support and guide means, 10. In an internal pipe cutting tool as claim in claim 9, wherein:

a. said plurality of cutting jaws have a cutting head support section shaped to fit into close engagement with each other when the cutting jaw assembly is in the normally closed position and sized to fit into the pipe to be cut, b. each of said cutting head support sections having at least two radially extending inner surfaces which intersect so that the inscribed angle there between is 120°, and c. the outer face of each of said cutting head support section is formed as a part of a circle over an arc of 120°.

* * * * *